United States Patent
Walter et al.

(10) Patent No.: US 11,078,822 B2
(45) Date of Patent: Aug. 3, 2021

(54) METHOD FOR OPERATING AN INTERNAL COMBUSTION ENGINE INSTALLED IN A VEHICLE

(71) Applicant: TECHNISCHE UNIVERSITAET DRESDEN, Dresden (DE)

(72) Inventors: Robert Walter, Freital (DE); Tilo Ross, Radeberg (DE); Hans Zellbeck, Freital (DE)

(73) Assignee: TECHNISCHE UNIVERSITAT DRESDEN, Dresden (DE)

( * ) Notice: Subject to any disclaimer, the term of this patent is extended or adjusted under 35 U.S.C. 154(b) by 206 days.

(21) Appl. No.: 16/304,198

(22) PCT Filed: May 19, 2017

(86) PCT No.: PCT/EP2017/062101
§ 371 (c)(1),
(2) Date: Jan. 25, 2019

(87) PCT Pub. No.: WO2017/202716
PCT Pub. Date: Nov. 30, 2017

(65) Prior Publication Data
US 2020/0318520 A1 Oct. 8, 2020

(30) Foreign Application Priority Data

May 23, 2016 (DE) ..................... 10 2016 208 834.3

(51) Int. Cl.
*F01N 9/00* (2006.01)
*F02D 41/00* (2006.01)
(Continued)

(52) U.S. Cl.
CPC ........... *F01N 9/00* (2013.01); *F02D 41/0007* (2013.01); *F01N 3/2066* (2013.01); *F01N 11/00* (2013.01);
(Continued)

(58) Field of Classification Search
CPC combination set(s) only.
See application file for complete search history.

(56) References Cited

U.S. PATENT DOCUMENTS

| 7,640,727 B2 * | 1/2010 | Kitahara ............... F02D 41/403 60/285 |
| 9,238,402 B2 * | 1/2016 | Sugimoto ........... F02N 11/0829 |

(Continued)

FOREIGN PATENT DOCUMENTS

| DE | 10241497 | 4/2004 |
| DE | 10302244 | 8/2004 |

(Continued)

OTHER PUBLICATIONS

Heiko Sequenz: Emission Modelling and Model-Eased Optimisation of the Engine Control. Feb. 25, 2013, http://tuprints.ulb.tu-darmstadt.de; XP055281312.

(Continued)

*Primary Examiner* — Binh Q Tran
(74) *Attorney, Agent, or Firm* — Jacobson Holman PLLC (57) ABSTRACT

The invention relates to a method for operating an internal combustion engine installed in a vehicle, in particular a diesel engine, in which the instantaneous concentration of a pollutant contained in the exhaust gas, in particular the $NO_x$ concentration in the exhaust gas, is measured or calculated in the flow direction after an exhaust gas aftertreatment. Using the determined pollutant concentration, the predefined distance- and/or power-based compliance with pollutant limiting values in mg/km or mg/kWh are monitored by means of specifically influencing the operating parameters of the internal combustion engine and/or an exhaust gas after treatment system in regulated form.

9 Claims, 5 Drawing Sheets

(51) Int. Cl.
*F01N 3/20* (2006.01)
*G01N 11/00* (2006.01)
*F01N 11/00* (2006.01)

(52) U.S. Cl.
CPC ...... *F01N 2610/02* (2013.01); *F02D 2250/36* (2013.01)

(56) References Cited

U.S. PATENT DOCUMENTS

| | | | | |
|---|---|---|---|---|
| 9,670,812 | B2* | 6/2017 | Asaura | F01N 3/2066 |
| 2002/0152741 | A1* | 10/2002 | Bidner | F01N 3/0842 60/274 |
| 2004/0144085 | A1* | 7/2004 | Surnilla | F01N 3/0814 60/295 |
| 2011/0264353 | A1 | 10/2011 | Atkinson | |
| 2014/0343828 | A1 | 11/2014 | Mueller et al. | |
| 2015/0167521 | A1* | 6/2015 | Sakurai | F01N 3/22 422/105 |

FOREIGN PATENT DOCUMENTS

| | | |
|---|---|---|
| DE | 102008015256 | 10/2009 |
| DE | 102014214431 | 1/2016 |
| DE | 102014215577 | 2/2016 |
| DE | 102014118125 | 5/2016 |
| DE | 102015222684 | 5/2016 |
| GB | 2531368 | 4/2016 |
| WO | 2009/088437 | 7/2009 |
| WO | 2016/005414 | 1/2016 |

OTHER PUBLICATIONS

Hoel Langouet: Engine calibration: multi-objective constrained optimization of engine maps. Optimization and Engineering; International Multidisciplinary Journal to Promote Optimization Theory & Applications in Engin. vol. 12, No. 3, Apr. 5, 2011, pp. 407-424.
Kristian Jankov: Beitrag zur automatisierten Steuerkennfeld-Applikation bei Fahrezeug-Dieselmotoren. http://opus.kobv.de/tuberlin/volltexte/200181972/pdf. Aug. 28, 2008.

* cited by examiner

METHOD FOR OPERATING AN INTERNAL COMBUSTION ENGINE INSTALLED IN A VEHICLE

The invention relates to a method for operating an internal combustion engine installed in a vehicle, in particular, a diesel engine, which is preferably installed in a passenger car.

The continuous intensification of emission limits therefore justifies the use of corresponding measures inside and outside of the engine. On the basis of the admissible limiting values, particularly for NO), emission, a reduction of up to 73% between 1990 and 2020 was forecast. However, to date, measurements taken by the Federal Environmental Agency have not been able to verify these predictions. In particular, near-by-traffic and inner-city $NO_2$ emissions still show consistently high values. Due to this fact that mainly results due to the deviations between the emission values during test cycles and during customer operation, from September 2017, within the scope of the certification process, an exhaust gas emission test during real driving operations will also be introduced in order to show possible application differences between the dynamometer (laboratory) and the road (reality).

The measurement of the real emissions of pollutants, in addition to $NO_x$, such as CO, $CO_2$, soot and unburned hydrocarbons shall take place on the vehicle with the aid of a mobile emission measurement system (portable emission measurement system—PEMS), which must carried with the license-relevant vehicle. In comparison with the test procedure on the chassis dynamometer, which takes place subject to defined and constant boundary conditions, a much greater number of parameters result during real driving operations, which extremely influence the operating behavior of the internal combustion engine and, thereby, also the emission behavior of the vehicle to a considerably greater extent. Thereby, in order to prevent so-called misuse, meaning, for example, due to an aggressive driving style (interplay between the gas and the brake pedal), or other worst-case scenarios, certain boundary conditions (BC) are specified by the legislator. Thereby, influencing factors, in particular, include the ambient temperature, the altitude above sea level, the average gradient of the road, the vehicle speed, cold start, driving style, the shifting behavior of a transmission and the maximum speed of the vehicle. Several of these parameters cannot be planned or foreseen.

The use of exhaust gas aftertreatment systems (for example, catalytic converters) is the current state of the art in the case of gasoline and diesel engines. Thereby, in the case of a sufficient exhaust temperature, the conversion of the pollutant components: carbon monoxide CO and unburned hydrocarbons HC as well as, in the case of homogeneous gasoline-engine combustion ($\lambda$=1), also nitrogen oxide can be ensured to the furthest extent. In the case of a diesel engine, up until this point, additive mixing of exhaust gas into the intake air by means of emission gas recirculation (EGR) has been sufficient to reduce NON emission. However, since the introduction of the Euro-6 emission standard in the passenger car sector at the latest, additional measures outside the scope of the engine must be fallen back on. Thereby, the NO), storage catalytic converter (NSC) for small cars and the selective catalytic reduction by means of urea (SCR) for the upper middle and upper class have persevered. The current interpretation criterion for exhaust gas aftertreatment systems (also applies to all other components on the car internal combustion engine) is significantly oriented on the certification-relevant operating range to ensure an optimal operation therefor. However, the compromise between light-off behavior (thermal capacity), effect range (spatial speed/dwell time) and cost factors must be taken into consideration. The mass flow range to be covered in the case of car engines requires a large catalytic converter volume due to the comparably low reaction speed for the nitrogen oxide reduction. The required exhaust gas energy for heating increases correspondingly, thereby, delaying the light-off. A combination of a plurality of systems (e.g. NSC and SCR) or multi-stage systems can provide aid at this point, however, they are considerably more cost-intensive and require corresponding installation space.

With regard to the real exhaust gas emission (real drive emission RDE), not only the operating range in the engine characteristic map increases, the operating limits of several systems are also exceeded and their functional quality (efficiency) is considerably reduced.

Due to an exhaust gas mass flow, which is too high or an exhaust gas flow, which is too high, or an exhaust gas temperature which is too high, the reduction of the $NO_x$ emission for many operating points of the internal combustion engine is possible to a limited extent ($\eta_{conv.}$<95%).

To date, the engine application cannot be largely changed during the driving operation in normal cases. The operating modes additionally stored in the engine control unit are used, among other things, only for the interval-dependent regeneration of the exhaust gas aftertreatment or engine cold start or warm-up. In addition to the objectives of a sufficiently high degree of process efficiency and compliance with various operating and load limits, as previously mentioned, the motivation is mainly oriented on the certification cycle in the case of engine control system design. Generally, this process must take place for every vehicle class and family on an individual basis by means of corresponding modification. With regard to the impending RDE certification, this type of approach can only be implemented in the future in a restricted manner. Due to the large degree of freedom with regard to the driving profile and the high number of different influencing parameters, the compliance of the emission limiting values and, thereby, in particular, the compliance of the $NO_x$ limiting values is made more difficult. Furthermore, the design of the engine control system for the worst-case scenario is not reasonable for the customer and not possible with regard to setting the $CO_2$ target.

Therefore, it is the object of the invention to indicate possibilities for the compliance with emission limiting values for a pollutant contained in the exhaust gas of an internal combustion engine and, in particular, with $NO_x$ emission in the case of a diesel engine independent of the different influencing factors. Thereby, the drivability of a correspondingly powered vehicle should be ensured.

According to the invention, this task is achieved by means of a method, which comprises the features of claim 1. Favorable embodiments and further embodiments of the invention can be implemented using features designated in the subordinate claims.

In the case of the method according to the invention, the instantaneous concentration of a pollutant, in particular the $NO_x$ concentration in the exhaust gas in the direction of flow is measured or calculated after an exhaust gas aftertreatment. Using the determined pollutant concentration, the predefined distance- and/or power-based compliance with pollutant limiting values in mg/km or mg/kWh is/are monitored by means of specifically influencing the operating parameters of the internal combustion engine, in particular of the diesel engine, and/or an exhaust gas aftertreatment system in regulated form. The instantaneous calculation of the $NO_x$ concentration in the exhaust gas can, for example, be carried out as described in [A. Schoener: "Vorschlag einer Methode zur Berechnung der Stickoxid-Emission von Dieselmotoren" (Proposal of a method for calculation the nitrogen-oxide emission of diesel engines); dissertation, Carolo-Wilhelmina Technical University in Brunswick (Germany); 1975].

By means of the invention, a transition from the individual vehicle engine application, which can almost not be changed, to an adaptive universal operating strategy can be achieved. The essential core represents a not-yet-existing method/strategy for the operation of an internal combustion engine.

During regulation, in addition to the instantaneous concentration of a pollutant contained in the exhaust gas, also the instantaneous fuel consumption and/or the foreseeable fuel consumption corresponding to the respective driving situation depending on the respective driving style, the respective vehicle, vehicle status and environmental factors should be taken into consideration, in the case of regulated operation of the internal combustion engine. In this way, for example, in the case of an aggressive driving style, the regulation taking a specified pollutant limiting value into account, in particular, a $NO_x$ value as a reference variable across a longer time span can reduce the instantaneous pollutant emission more than is the case with a tranquil, calm and predictive driving style.

In the case of regulation, the instantaneous status of the exhaust gas aftertreatment system, in particular, its aging process, the fuel quality and/or the quantity, type and/or quality of the chemical compound (e.g. AdBlue) added to the exhaust gas aftertreatment for a nitrogen oxide reduction is/are taken into consideration during regulation.

An influence of the injected fuel quantity, of the point in time of the injection, the type of fuel injection, the boost pressure of added combustion air, the temperature of the combustion air, the temperature and/or the quantity of recirculated exhaust gas, the valve control times and/or the engine compression ratio can be carried out.

The invention opens up the possibility of regulating the operation of an internal combustion engine, taking the respective time and/or respective vehicle position into account by taking a correspondingly allocated pollutant limit into consideration. In this way, for example, a lower $NO_x$ limiting value during regulation can be taken into consideration within localities, an environmental zone or a natural reserve than is the case outside of such regions. Regulation can take place at night under consideration of a higher $NO_x$ limiting value than is the case during the day.

For the regulation, engine characteristic maps stored within the engine control system can be used where the respective engine speed and engine load take the different variants into consideration for diesel engine operation. During regulation, an interpolation can be carried out if no engine characteristic map corresponding to the respective operational state of the internal combustion engine is available within the engine control system.

A selection of the respective variant can be carried out in the case of regulation taking control deviation into account without interpolation between the variants depending on the control deviation with corresponding interpolation or a conversion of the reference variable into an operating-point-dependent target value for the raw pollutant emission, such as, for example, $NO_x$ in [g/(kW·h)] and a corresponding modification depending on the control deviation. The control deviation describes the deviation between target and actual variables, meaning the difference between the limiting value and the current value of the distance-related pollutant emission (e.g.: $\Delta_{control\ deviation} = NO_{x,\ limit\ value} - NO_{x, current\ value}$ in [g/km]).

Thereby, the real-time monitoring of the actual pollutant concentration in the emission gas represents the starting point for the method by means of calculating or sensors in the exhaust gas system after an existing exhaust gas aftertreatment. By integrating (cumulation) these values, taking the respective traveled distance into account, thereby, the comparison with the limiting values to be complied with is possible. Depending on the exceedance of the limiting value or the corresponding distance (control deviation), the engine control system is adapted in order to adhere for example to the respective compromise between $CO_2$— and $NO_x$ emission in the most optimum manner possible.

Figure 1:
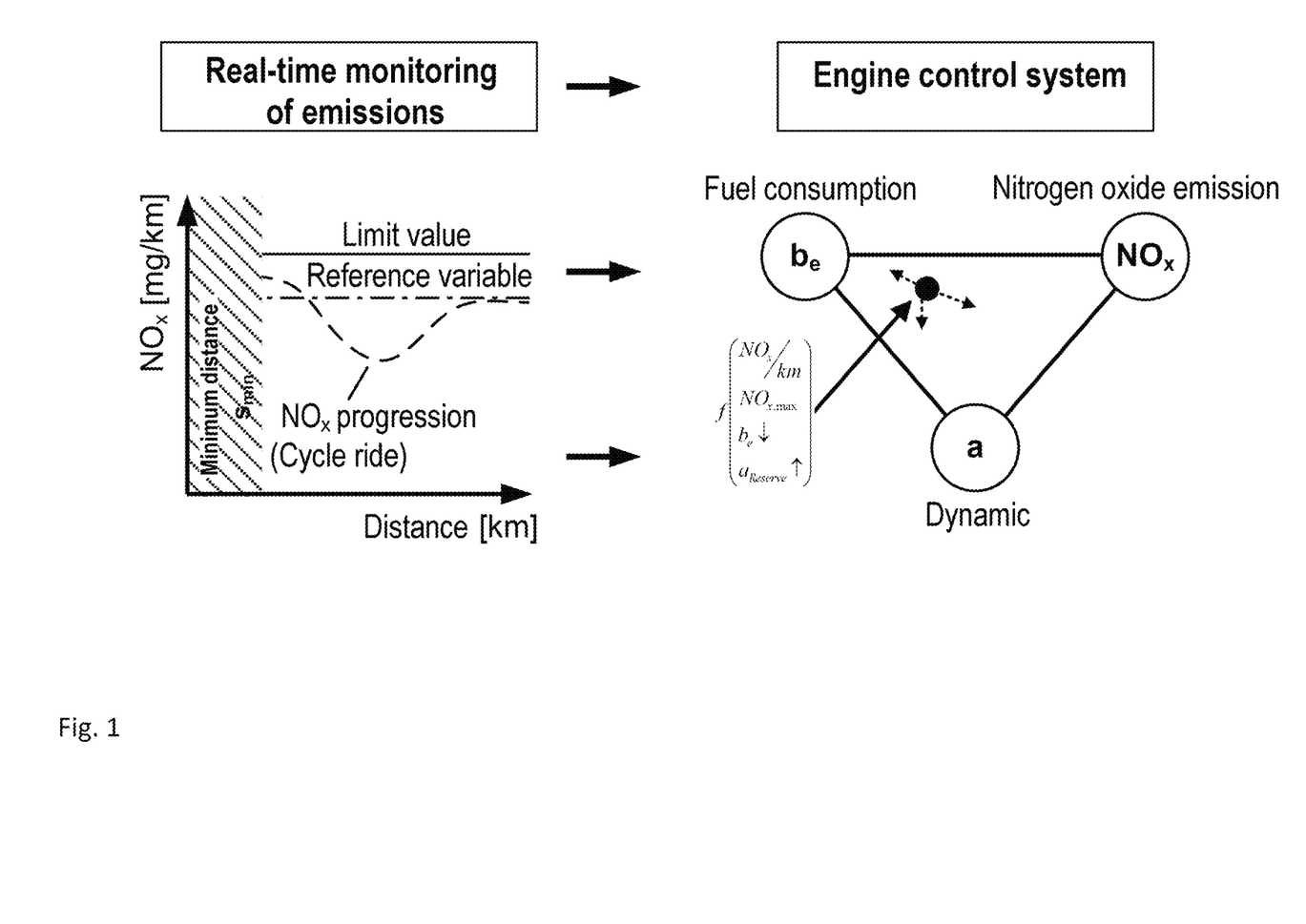
FIG. 1 a schematic illustration for the regulated adaptation of the engine control system for complying with the required nitrogen oxide limiting value during real driving operation.

Specifically, this means: An "optimized" engine application is no longer used for the engine/vehicle combination, but a regulation of the diesel engine is carried out depending on the respective pollutant emission, wherein engine operational characteristic maps stored within the electronic engine control system can be fallen back upon. Thereby, the selected operating strategy can comprise different partial applications with different optimization emphases and also stay independent of the vehicle by means of this. Depending on the target value, shifting between the individual applications or interpolation due to the regulation can take place. As is schematically shown in FIG. 1 using the example of $NO_x$ emission, a continuous optimization between a high process efficiency, a low nitrogen oxide emission and available engine dynamics taking the current distance-specific pollutant emission into consideration takes place. In the case of a specified $NO_x$ limiting value, a smaller $NO_x$ value can be chosen as a reference variable. As can be recognized, in particular, from the diagram shown on the left in FIG. 1, the actual maximum permissible $NO_x$ limiting value during engine operation, for example, during the warm-up phase, can also be exceeded over the short term. However, it should be ensured that the $NO_x$ limiting value is cumulatively adhered to across a specified minimum distance, preferably of at least 2 km. The right illustration of FIG. 1 shows that diesel engine regulation during operation should take place in such a way that, in addition to the $NO_x$ limiting value, also the $CO_2$ emission over the fuel consumption $b_e$ can be taken into consideration and, at the same time, safe driving of a vehicle powered by a diesel engine can also be possible.

Thereby, the regulation should take place in such a way that the cumulative $NO_x$ limiting value is adhered to across the entire distance and, above all, when ending the ride. Thereby, a minimum distance of 2 km should be taken into consideration. Thereby, the maximum measured or calculated $NO_x$ value must not be exceeded at any point in time. In particular, short-term exceedances in the case of certain driving situations may occur and be tolerated if the average value lies under the respective specified $NO_x$ limiting value.

The greatest challenge in developing diesel engines is the consequent representation of minimum $NO_x$ emission with a low $CO_2$ emission at the same time.

In addition to the means to reduce the $NO_x$ emission that have already been mentioned, in the case of regulating diesel engines, an exhaust gas recirculation can with a correspondingly adapted exhaust gas recirculation rate, taking the respective instantaneously calculated or measured $NO_x$ value of the exhaust gas directly before entering into the ambient environment into account, meaning taking all exhaust gas aftertreatments performed into account such as, for example, the separation of particles and SCR technology.

In the case of a corresponding design and dimensioning of the exhaust gas aftertreatment system, it can be implemented that the reduction of $NO_x$ emission inside the vehicle via EGR can be done without, thereby being an "SCR-ONLY" operation. However, the considerably greater spread of the exhaust gas mass flow that can be generated in the case of internal combustion engines with car use causes that a design compromise with regard to the catalytic converter size is to furthermore be taken, as has already been explained.

Conventional systems with a dimensioning emphasis on a certain test cycle reach the effect limit quickly during RDE operation. For this reason, a combination between an exhaust gas aftertreatment system and the use of EGR with an expansion leading all the way to full engine load (high-load EGR) is desirable.

It is generally known that the EGR results in increasing fuel consumption and particle emission. The latter is fully reduced again due to the use of a particle filter, however, it also causes an increase in $CO_2$ emission due to the required interval-based regeneration (soot ignition). As a consequence, a holistic consideration of pollutant minimization inside and outside the engine should take place.

For a precise evaluation of the EGR influence and effect on the combustion, as well as the exhaust gas emission, various test series were carried out on a single-cylinder test engine and on a highly dynamic engine dynamometer on an exhaust gas turbocharged 2.0 l diesel engine with common-rail direct injection, as well as high-pressure and cooled low-pressure EGR.

The inner-engine influence of the $NO_x$ emission is based on the Zeldovich mechanism to the furthest extent and, thus, primarily depends on the combustion temperature. Various possibilities are available for the required reduction in temperature to reduce nitrogen oxide emission. In this way, the final compression temperature can be decreased by sinking the charge-air temperature by means of a charge-air intercooler. However, in the case of a reasonable energy expenditure, this measure is limited to the cooling of the charge air up to a maximum of the ambient temperature level. The use of Miller or Atkinson valve control times or homogeneous or partially homogeneous combustion processes can be used in a target-oriented manner with limitations in the full-load and nominal performance range in the case of $NO_x$ reduction. The most influential and simple-to-implement measure for reducing the $NO_x$ emission on car diesel engines is the recirculation of exhaust gas (EGR) in the intake system. The increase in the inert gas proportion in the combustion chamber achieved by means of this lowers the oxygen partial pressure and significantly increases the thermal capacity of the charge mixture. As a result, the peak combustion temperature decreases. However, the lower oxygen content promotes the formation of other pollutant components at the same time, above all however, the formation of soot. In accordance with that, the level of exhaust gas recirculation (EGR rate) is subject to a permanent compromise. The water injection into the combustion chamber with comparable action could provide a remedy in this respect. However, due to existing challenges (e.g. the provision of water), it has not, to date, been shown to be ready for serial production.

In addition, in comparison to the pure substitution of oxygen by means of recirculated exhaust gas, in the case of increasing the EGR rate at a constant air ratio that is simultaneously adhered to, the increase of soot particle emission can be limited. With regard to a constant soot emission, the boost pressure of added combustion air should be yet further increased, ($\lambda\uparrow$), wherein, in contrast, the achievable $NO_x$ emission reduction can thereby be reduced. Furthermore, in the case of increasing the EGR rate at a constant air ratio, an increase in the combustion efficiency and thereby a decrease in the specific fuel consumption can be achieved at all operating points.

In contrast to the single-cylinder test engine, the sphere of influence of the internal-engine process expands in multi-cylinder engines. This mainly concerns the charge exchange and the respective turbomachines of the exhaust gas turbocharger or a separately powered compressor for added combustion air. Depending on the required intake volumetric flow and exhaust gas enthalpy flow, different conditions for the charge exchange result, which have a direct influence on process efficiency. This results in any advantages that are shown during tests on the single-cylinder test engine being compensated for again or even being overcompensated for. Above all, operating points with high boost pressure requirements cannot be readily implemented on a multi-cylinder engine.

In the case of a multi-cylinder engine, the specific fuel consumption initially decreases as the EGR rate increases and increases again at considerably higher EGR rates. The required higher boost pressure requires a stronger damming of the exhaust flow before the turbine, thereby causing an increase in exhaust gas back pressure. Boost and exhaust gas back pressure increase approximately at the same time up to an EGR rate of approx. 24% (at the operating point with an engine speed of 2,100 $min^{-1}$ and 7 bar of effective intermediate pressure) so that no disadvantage or almost no change occurs to the charge exchange. In comparison to operating without EGR, a consumption advantage of approx. 2% results in the case of reducing the $NO_x$ by approximately 75%. The recirculation of exhaust gas via a low-pressure EGR path can lead to the increase of volumetric flow to the turbomachines of a turbocharger system. At the same time, the respective operating point in the compressor characteristic map can be moved to higher pressure ratios. Although the efficiency of the compressor and turbine can be considerably improved by means of this, no recognizable change to the charge exchange takes place. Only in the case of considerably higher EGR rates (>24%) does the charge exchange intermediate pressure increase due to the disproportionately increasing exhaust gas back pressure. The recycled exhaust gas causes the increase in the charge density within the cylinder subject to the precondition of a constant air ratio. As a consequence, the final and peak compression temperature can be decreased during combustion due to the higher level of thermal capacity of the charge mixture. Thereby, the temperature gradient between the components delimiting the combustion chamber and the combustion-gas mixture is reduced. As a consequence, wall heat losses decrease although the gas-side heat transfer coefficient increases due to the higher charge density, among other things. Thereby, the internal-engine efficiency can be increased.

A general transferability to other operating points within the engine characteristic map depends on the existing limits, among others, with regard to charge pressure, exhaust gas back pressure and compressor outlet temperature as well as other characteristics of the exhaust gas turbocharger or compressor. The division between low and high-pressure EGR and the use of corresponding EGR cooling also have an influence.

Furthermore, the increase of fuel consumption due to shorter regeneration intervals of the diesel particle filter (DPF) must be heeded to due to a higher particle emission.

A doubling of the entry of soot into the DPF usually increases the $CO_2$ emission by an average of approximately 2%.

Based on the dependencies listed, the aim of a low NO), emission and a low fuel consumption while securely staying below the legally prescribed limiting values at the same time can only be implemented by monitoring the distance-specific emission and corresponding regulated adaptation of the engine control system.

In the following, the aforementioned findings are taken into consideration in the case of model generation and method analysis.

The development and application effort for the automobile manufacturer significantly increases due to the real driving emission legislation. This mainly relates to the equipment of vehicles with mobile exhaust gas measurement technology, carrying out corresponding test drives and the effort for storing additional characteristic map data for the operation of the respective diesel engine. Against this background, a transfer and depiction of real driving operation to a highly dynamic engine dynamometer taking into account the various influencing parameters (road gradient, curve maneuvers, wind, etc.) is possible and meaningful.

By means of this, the technical, financial and time expenditure for emission measurement during the test and development phase can be considerably reduced.

In the following, the invention will be explained in more detail in an exemplary manner.

The basis for a developed model to calculate the engine process as well as the executed tests formed a four-cylinder diesel engine with a common-rail direct injection system with exhaust gas turbocharging. The 2.0 l series engine reaches a maximum full-load torque of 330 nm and provides up to 110 kW at the rated output point. Thereby, as a standard, a water/air-charge-air cooler is used for cooling the compressed intake air, which is operated in a separate low temperature circuit. The engine internal reduction of $NO_x$ emission takes place via a combined EGR system, which consists of low-pressure and high-pressure exhaust gas recirculation (LP- and HP-EGR). In the case of the LP-EGR, the exhaust-air partial flow removed after the DPF is cooled before introduction into the compressor line by means of a heat exchanger. In addition, a flap gate in the exhaust system partially implements the necessary pressure gradient for this. The high-pressure EGR is carried out uncooled and, thereby, the recirculated exhaust gas is introduced into the cylinder after the charge-air intercooler and before the inlet channels. For the engine external reduction of pollutant emission (CO, HC, soot), the diesel oxidation catalytic converter (DOC) and the subsequent DPF are arranged close to the motor. By means of the aforementioned exhaust gas aftertreatment system, the engine fulfills the Euro-5 emissions standard.

The developed simulation model in the simulation environment GT-SUITE/GT-POWER (Version 7.4.0, Build 4) comprises all relevant components of the internal combustion engine. Starting from the realistic representation of the charge exchange and the modeling of the various wall heat transfers and heat capacities, the combustion process and the raw exhaust gas emission are predictively calculated with the aid of phenomenological models. The required calibration and validation took place based on available measurement data from the highly dynamic engine dynamometer. From the viewpoint of the general pre-calculation capacity and qualitative assessment, in this way, a sufficiently good concordance can be achieved.

A vehicle model was used for the illustration and the simulation of driving cycles. The model developed in MATLAB/SIMULINK for highly dynamic engine dynamometers was coupled to the engine model of the 1D simulation via appropriate interfaces. All relevant characteristics of the vehicle and the drivetrain (e.g. gearing and clutch) as well as the boundary conditions occurring during the real ride depicted the vehicle model. An integrated driver model assumes the task of speed control. Depending on the speed difference ($v_{current} - v_{target}$), the calculated torque requirement is passed on to the engine operating model. With the aid of the recirculation value, the torque calculated within the engine operating model, the vehicle operating model determines the speed, as well as the corresponding engine speed. The latter is also specified for the engine operational model.

Figure 2:
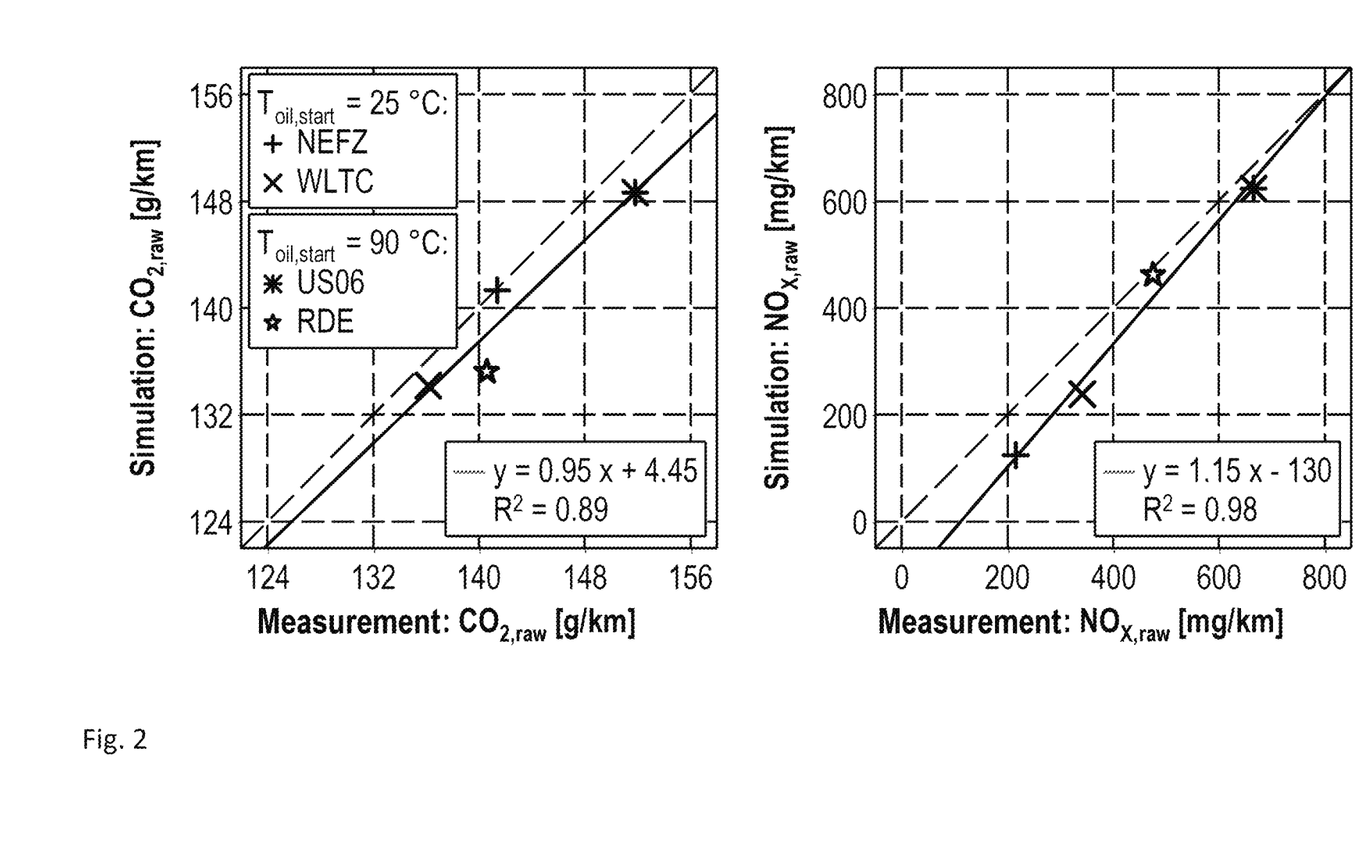
FIG. 2 a comparison of measurement and simulation for the specific $CO_2$ and $NO_x$ emission in the case of various driving cycles.

In FIG. 2, the distance-specific emission of $CO_2$ and $NO_x$ for a current middle-class vehicle is shown as an example for various driving cycles, thereby indicating a comparison between measurement and simulation for the specific $CO_2$ and $NO_x$ emission during various driving cycles. At this point, it must be noted that the low existing deviations between measurement and simulation accumulate from the previously mentioned stationary validation for this comparison case, thereby being able to portray a very good result.

The implementation of the aforementioned objective can be achieved by means of another control model, which is based on different variants of the engine application. For this purpose, applications with a low specific fuel consumption, meaning a high process efficiency, with a low $NO_x$ emission, as well as intermediate variants should be created.

The following explanations should demonstrate a possible application method and exemplary manner and should by no means be deemed complete. The term "variant" is used in the following for the respective version of the engine application and is specified with V 0.0 to V 1.0. Thereby, the design, implementation, and testing is carried out only by using an engine process simulation.

The application V 0.3 forms the starting point of variant development and essentially corresponds to the application of the underlying basic engine. A consumption-specific best variant (V 0.0) was generated, having been derived from this, which is, among other things, optimized with regard to the center of combustion and EGR rate within permissible limits (air ratio, cylinder pressure increase, etc.) For the motorized operation with minimum $NO_x$ emission, the EGR rate should be increased to the extent that the desired $NO_x$ emission has been configured. At the same time, an increase in charge pressure should take place in order to keep the combustion air ratio constant in comparison with the basic variant. If a target variable exceeds the specified limiting value, the torque is reduced to the last depictable operating point of the diesel engine. Furthermore, the isolines (lines with a constant EGR rate) in the generated EGR characteristic map run parallel to the effective intermediate pressure in contrary to the basis. By means of this, the nitrogen oxide raw emissions can be kept almost independent from the engine speed. In order to improve the regulation quality of the model, furthermore, an application V 0.7 with interpolated EGR rates between the basic variant (V 0.3) and the variant with a minimal $NO_x$ emission (V 1.0) can be formed. The design of the distribution between LP- and HP-EGR can take place with regard to the optimal efficiency range for the compressor and turbine.

Variants of the engine operation with an identical division between LP and HP-EGR as well as the achievable full-charge curves, at a consumption optimal all the way to a minimal $NO_x$ emission, and the differences of the individual variants can be recognized at two different partial charge operating points. As the $NO_x$ emission decreases, the specific fuel consumption continually increases. At the same time, the air ratio (with limitations in the case of the consumption-optimum variant) remains constant.

In addition to the emission differences, the various tested variants have considerable differences with regard to dynamic behavior. In particular, the regulation at high EGR rates in the range of full charge delays the building up of boost pressure, thereby increasing the time until the desired torque has been achieved. In addition, the specification of the EGR rate during genset loading plays a crucial load. The rate reduction with an existing boost pressure difference leads to an improved dynamic behavior and a lower soot emission, however at the same time, it causes a higher $NO_x$ emission. Based on an elasticity test during acceleration of the vehicle, differences also occur due to the influence of the EGR take-back (EGR reduction) while the genset loading as well as the shifting strategy (used with and without shifting back). Higher EGR target values increasingly increase the time until the target speed is reached. At the same time, a considerable decrease in $NO_x$ emission with a significant increase of soot emission associated therewith can be recorded. Doing away with the reduction in EGR intensifies this effect. The temporal delay can be reduced by shifting back to greater gear ratios, wherein the $NO_x$ emission decreases due to the lower engine torque, however, the particle and $CO_2$ emission increase in the process.

The created simulation model, which has already been addressed, obtains different engine characteristic maps for the control and regulation of the respective process variable. Via the target values, engine speed and engine load, reference and pre-control variables, such as boost pressure, EGR, position of the boost pressure regulator/VTG setting, fuel mass and points in time of injection are stored. For the simultaneous provision of the different application variants, the mentioned engine characteristic maps are transferred into a MATLAB/SIMULINK model. Via a corresponding interface, only the target values can be provided to the 1D simulation program, which correspond to the selected variant. Furthermore, the model calculates the distance-specific emissions and makes the implementation for the control and variation of the variants possible.

Figure 3:
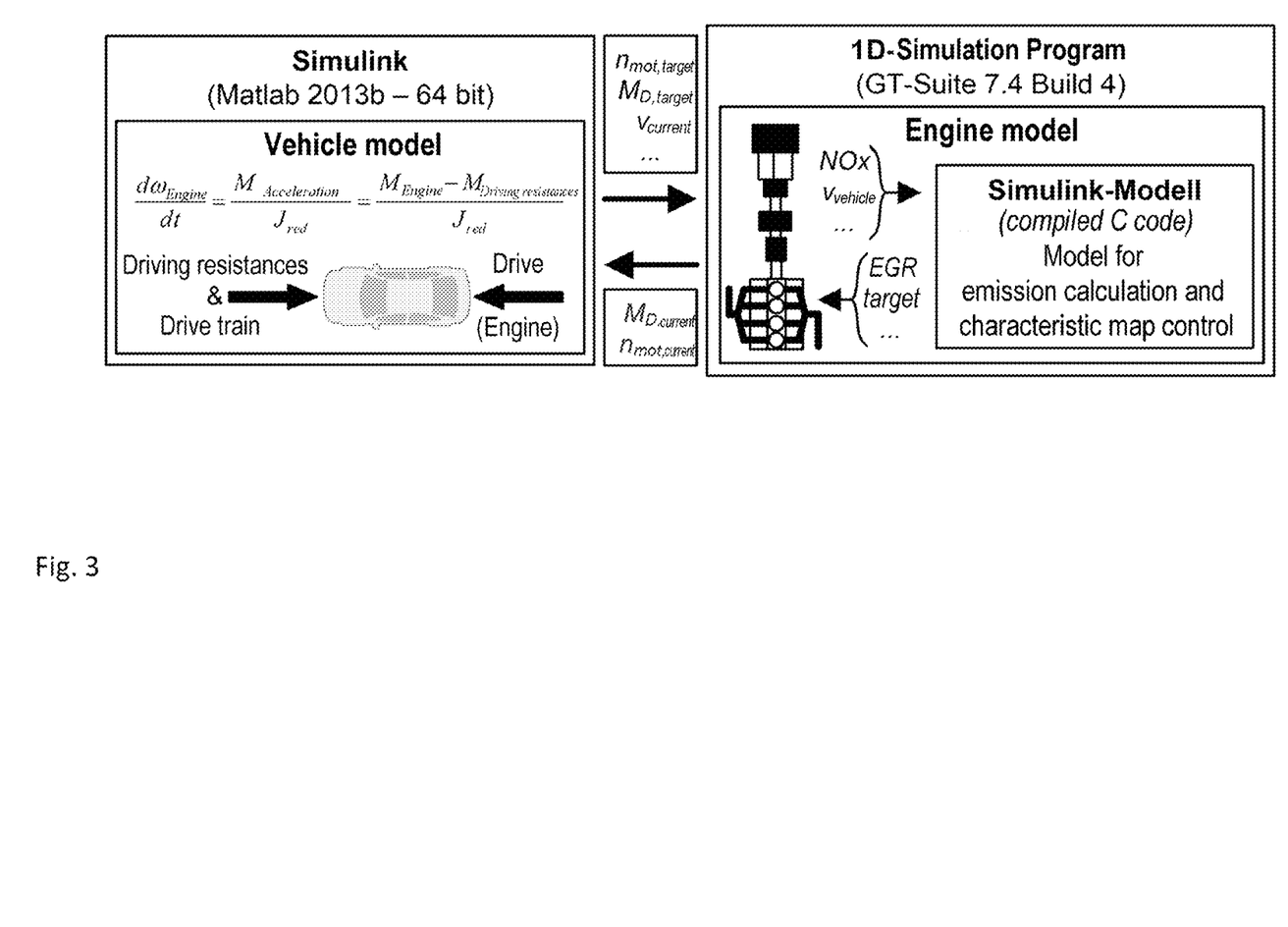
FIG. 3 schematically, the integration of the MATLAB/SIMULINK model for controlling the motor into a 1D simulation model.

FIG. 3 schematically shows the integration of the MATLAB/SIMULINK model for controlling the engine into the 1D simulation model, the coupling to the vehicle model as well as the transfer process and control variables.

Figure 4:
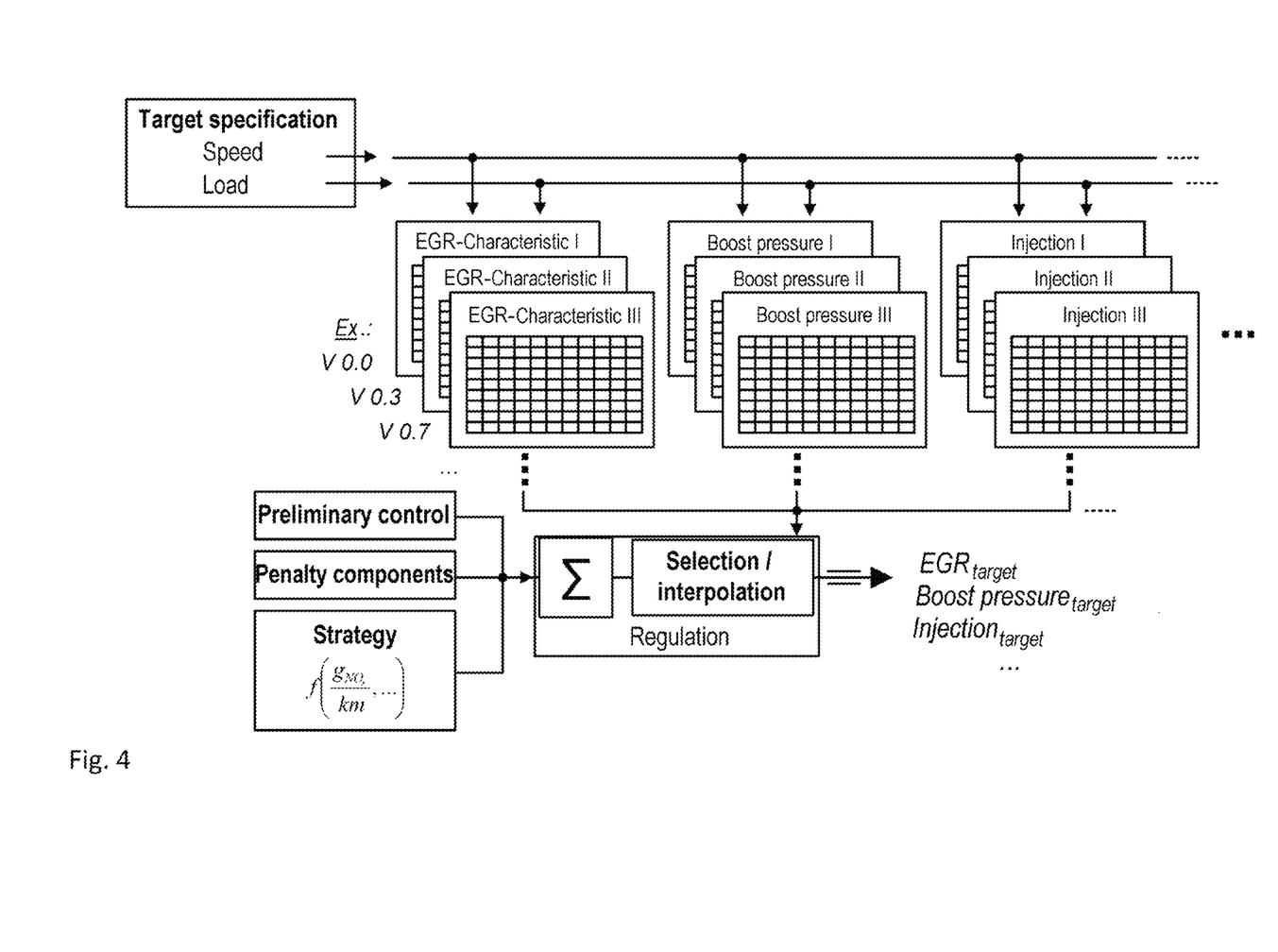
FIG. 4 a coupled model for calculation of driving cycles (vehicle model engine operating model application model) and FIG. 5 a diagram of emissions across a specifiable cycle time.

The various generated variants are, as has been explained previously, stored in diverse engine characteristic maps in the MATLAB/SIMULINK model. According to the selected variant as well as the target values for engine speed and load, the process control variables (e.g. EGR rate) can be taken from the respective engine characteristic maps and passed on to the engine operating model. For the case that no engine characteristic maps exist for the specified variant, the interpolation between the values of contiguous engine characteristic maps is possible. FIG. 4 schematically illustrates this approach.

The basis for the selection and control of the respective variants represents the continuous monitoring of exhaust gas emission. The calculated emission values from the engine operating model are recorded by the MATLAB/SIMULINK model, temporally integrated, referred to the distance driven and used for the engine operation as a control variable.

The specification of the $NO_x$ limiting value to be satisfied in [g/km] is used as a reference variable for the variant control. For implementing the regulation and, if applicable, the control, three different regulation versions were analyzed in detail:
 #a Variant shifting depending on the control deviation (without interpolation between the variants)
 #b Controlling the variants depending on the control deviation with corresponding interpolation
 #c Conversion of the reference variable into an operating-point-dependent target value for the raw emission in [g/(kW·h)] and corresponding modification depending on the control deviation.

In the latter case, depending on a stored drive resistance curve, the reference variable is converted into a target value for raw nitrogen oxide emissions in [g/(kW·h)]. Based on the comparison with the current raw nitrogen oxide emission calculated in advance, which can also be stored in corresponding characteristic maps for each variant in the simplest case, the selection of the required variant takes place. Under the assumption of a continuous transfer between the variants with regard to $NO_x$ emission, a variant interpolation, meaning an interpolation between the required engine characteristic maps, is permissible. In addition, a continuously linear controller, PID controller, modifies the reference variable, instantaneous $NO_x$ emission with the aid of a downstream offset in order to ensure that the reference variable and the target value are achieved and complied with.

The control model in MATLAB/SIMULINK furthermore obtains a simplified calculation model to depict an exhaust gas aftertreatment system for the selective catalytic reduction by means of urea. This contains the characteristics for the light-off behavior (i.e. the progression/development of the conversion rate over the temperature, among other things), the minimum temperature as well as the dosage quantity ratios for the urea injection and the deterioration of the conversion behavior at excessively high spatial speeds. Using the calculated implementation efficiency (limited to maximum of 95%) the $NO_x$ emission is determined according to the SCR system, which, in turn, can be used as a new control variable. Particularly for the regulation version #c, the efficiency of the exhaust gas aftertreatment can thereby be taken into consideration and, accordingly, the target value specification leads to the increase of the raw nitrogen oxide emissions to be configured.

The calculated reduction of nitrogen oxide cannot be taken into account by the calculation model in this case for the recirculated exhaust gas (LP-EGR) and the intensifying effect thereby achieved in the case of raw nitrogen oxide reduction.

In the following, the results of the analyses will be presented for the variable application on a diesel engine. First of all, the certification-relevant test cycles are used for verification of functionality: New European Driving Cycle (NEDC), Worldwide harmonized Light vehicles Test Cycle (WLTC), Federal Test Procedure (FTP75), Aggressive Driving Cycle (US06) as well as the newly developed internal RDE cycle, which should fulfill the current legal requirements subject to complying with the prescribed boundary conditions. Following this, different variations show the universal applicability of the engine operation strategy developed.

The function of the engine operating strategy can be demonstrated using the example of the NEDC using a current middle-class vehicle with a mass of approximately 1.7 t. Three versions of regulation with an emphasis on the results of the $CO_2$, $NO_x$ and soot emission were analyzed. The consideration initially occurred without taking the SCR system into consideration. The distance-specific nitrogen oxide raw emission served as a control variable. Due to the formation of quotients for the control variable (emission mass $NO_x$ per distance unit), the regulation for a distance $s_{min}$ has been set with a value of 2 km. Variant V 0.3 serves as an initialization. In the case of the operating-point-dependent regulation version #c, the initialization is limited to a constant value of the downstream offset for the distance $s_{min}$.

With all three variants for the regulation, the defined $NO_x$ limiting value in g/km could be precisely adhered to in a sufficient manner. In comparison with the basis, however, with reference to the $CO_2$ and soot emission for the versions #a and #b, greater differences were shown, the extent of which was considerably coupled to the settings of the respective controller. This behavior was shown in all examined driving cycles (WLTC, etc.). The background entails an only insufficiently possible selection of a generally valid setting of the PID controller. The result achieved is correlated with the dynamics of the controller and, at the same time, with the length of the text cycle. This results in a trade-off in controller configuration.

The best results could be achieved using the control version #c. The speed-dependent variant control at first approximation requires a considerably lower control intervention and allows a comparably "slow" control parameter with a greater time constant. In contrast, for this version, the variant used changes almost for each time step. For limiting and stabilization, the regulation only occurred for speeds over 2 km/h and load conditions above 5 Nm. Otherwise, the variant to be used has been specified directly. The intervention of the controller for the offset (control behavior) was, in particular, shown in the idling phases of the vehicle due to the slow change of the respectively chosen variant.

Furthermore, in the case of this variant of the regulation, the advantage arose that the effect of the SCR system was taken into consideration directly. Therefore, for further analyses, only this variant was further pursued.

The function of the regulation taking the SCR system into account should be described in the following using the example of the future certification cycle WLTC with the same vehicle configuration. At the beginning of the certification cycle, the start temperature of the engine as well as all gas-bearing components was 25° C. For the function of the SCR system, in addition to the actual catalytic converter temperature also the gas temperature at the urea injector must be taken into account. In addition to the exhaust gas temperature, the implementation level achieved across the cycle time using an SCR system also plays a role. As a reference variable for the regulations, a $NO_x$ target limiting value of 80 mg/km has been defined and an initialization distance $s_{min}$ of 2 km has been defined.

The light-off of the SCR system is achieved approx. 750 s after the cycle starts. As of this point in time, a considerable increase of nitrogen oxide raw emission is possible so that the engine can be operated with the consumption favorable variant. If the implementation level of the SCR system (e.g. approx. at second 1,500) drops on account of a high spatial speed in the catalytically coated sDPF due to a strong vehicle acceleration or an exhaust gas temperature that is too low, the variant is immediately changed, thereby being adapted to the instantaneous nitrogen oxide raw emission value.

The main advantage of the presented engine operating strategy results for use during real driving operation. The selected RDE cycle for the functional verification was divided almost evenly within the so-called third matrix (city, suburban, and highway). In relation to the driving dynamics, the driving style was in the upper third of the permissible range (values for $v \cdot a_{pos,>0.1}$).

The settings of the controller for the selection of the variants, which resulted from the optimization during the certification cycles were taken on for the RDE ride carried out here. Since, for each partial section, the required $NO_x$ limiting values must be adhered to, these settings have also been kept constant during the course of the cycle.

Initially, with no regard to the SCR system, regulation was performed to meet the nitrogen oxide value of a basis and then to a $NO_x$ limiting value of 80 mg/km with an additional reserve of 5%, taking the SCR system into consideration. The engine was, as is likely to be permitted by law, at operating temperature ($T_{off}$>70° C.) at the beginning of the RDE cycle.

Figure 5:
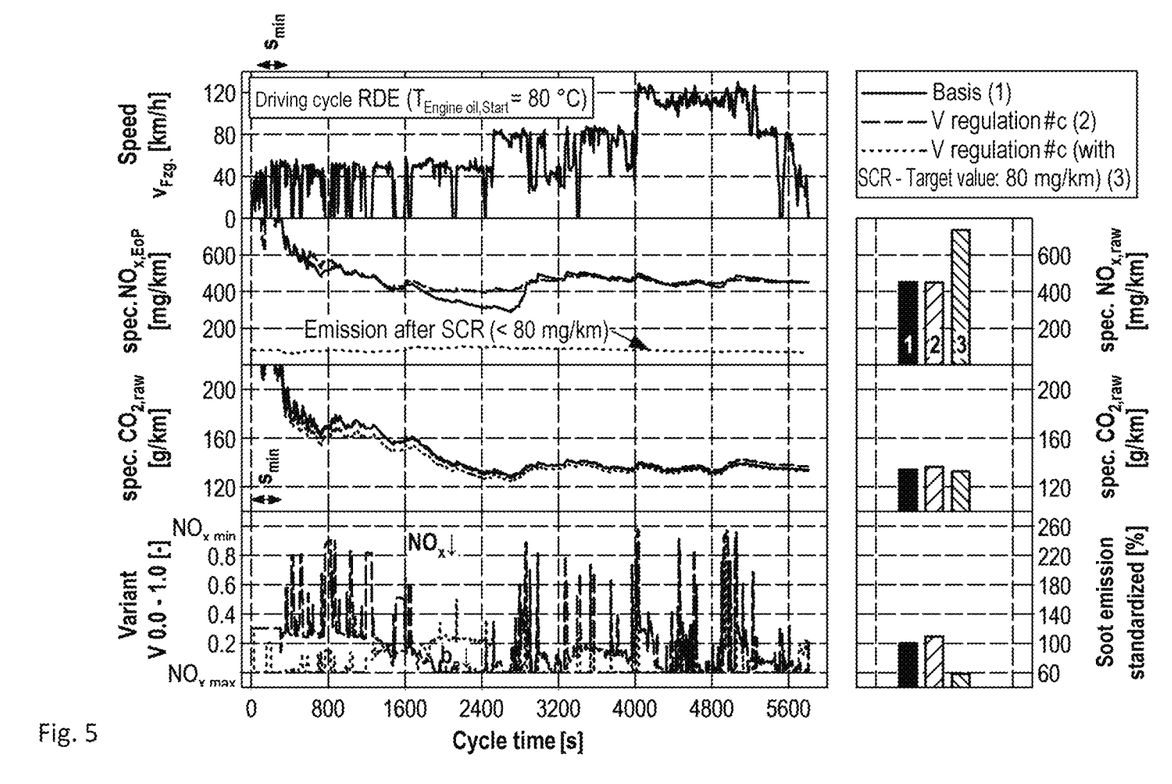

For case 2, the variant with a minimal $NO_x$ emission was set due to the existing control deviation after passing the minimum distance $s_{min}$ (for this, see also FIG. 5). As of approximately second 2,600, the $NO_x$ limiting value fell short so that variants can be configured that are favorable with regard to consumption. The operating with high EGR rates at the beginning of the cycle could be influenced in a positive manner due to an adaptation of the control parameters or the expansion of the minimum distance $s_{min}$ for the initialization range with regard to drivability. As a consequence, a decrease in soot emission would also result.

The exhaust gas aftertreatment at operating temperature for case 3 already made a conversion of nitrogen oxide possible at the beginning of the cycle. Thereby, the most economic variant can be configured up to the phases with a strong vehicle acceleration or at a lower exhaust gas temperature. During the second part of the city phase (1,200 s to 2,400 s), the exhaust gas temperature decreased to under 200° C. due to the distance profile, thereby reducing the implementation level of the SCR system. Consequently, with the aid of higher EGR rates, the raw nitrogen oxide emission was reduced to comply with the $NO_x$ limiting value.

With the aid of the method according to the invention, the advantage resulted that an adaptive adjustment of the respective instantaneous operational state (vehicle, driver, driving profile, etc.) could be achieved in order to comply with the required $NO_x$ limiting value. The potential of the method according to the invention is shown by a variation of vehicle mass and shifting behavior. These tests were carried out for the mentioned RDE cycle with an engine at operating temperature, wherein, for each case, the required limiting value of 80 mg/km including a 5% reserve was complied with.

Preliminary testing for the RDE test cycle has shown that an increase in vehicle mass by approximately 5% causes an increase in $CO_2$ emission of also approximately 5%. With the aid of the method according to the invention, the higher efficiency of the SCR system can be taken into consideration due to the increase in the exhaust-gas temperature. As a consequence, the increase of fuel consumption can be limited to half as much. However, at the same time, a higher consumption of the dose-injected urea results. A cost-specific optimization with regard to saving fuel and urea consumption is possible.

This applies also to a modified shift strategy. The dynamic shifting behavior with higher gear-shifting speeds reduces the scope of the SCR system. In order to adhere to the $NO_x$ limiting value, the raw nitrogen oxide emission is generally reduced bearing a disadvantage to fuel consumption.

By means of the invention, instantaneously valid and future certification methods for new passenger cars can be taken into consideration. Compliance with the legally prescribed $NO_x$ limiting values during real driving operation is extremely difficult. An adaptation of the engine application up until this point, which covers all possible boundary conditions and factors can only be implemented with great difficulty with regard to the requirements of drivability and low fuel consumption. The proposed transition from the vehicle-individual, almost unchanging engine control system to the adaptive universal regulation, thereby complying with the $NO_x$ limiting value during certification testing, and also in the case of an RDE cycle, is a critical step in the desired direction. According to the vehicle status, driving behavior and environmental conditions, the engine control system can be adapted in a regulated form. At the same time, the method according to the invention, thereby taking the exhaust gas aftertreatment system and the $NO_x$ emission into consideration as a compromise, ensures the best possible driving dynamics and $CO_2$ emission. As a result, for any engine, only method management is still required in of the instantaneously calculated or measured $NO_x$ value and the vehicle-specific modification that was usual up until this point will be deemed obsolete.

The invention claimed is:

1. A method for regulating an internal combustion engine installed in a vehicle, wherein the method comprises the steps of evaluating with an engine control system an instantaneous pollutant concentration contained in exhaust gas, in the flow direction after an exhaust gas aftertreatment and, monitoring a predefined distance of travel based compliance with pollutant limiting values in mg/km, and specifically regulating operating parameters of the internal combustion engine or an exhaust gas aftertreatment system based on the instantaneous pollutant concentration so that a limiting value is cumulatively adhered to across a specified minimum distance of travel.

2. The method as claimed in claim 1, wherein in addition to the instantaneous pollutant concentration, also at least one of an instantaneous fuel consumption or a foreseeable fuel consumption corresponding to a respective driving situation, depending on a respective driving style, a respective vehicle, vehicle status and environmental factors are taken into consideration, in the case of regulated operation of the internal combustion engine.

3. The method as claimed in claim 1, wherein an instantaneous status of an aging process of the exhaust gas aftertreatment system, fuel quality or the quantity, type or quality of chemical compound added to the exhaust gas aftertreatment for a pollutant reduction is/are taken into consideration during regulation.

4. The method as claimed in claim 1, including the step of regulating manipulation of injected fuel quantity, at a point in time of injection, type of the fuel injection, boost pressure of added combustion air, temperature of the combustion air, temperature or quantity of recirculated exhaust gas, valve control times or engine compression ratio.

5. The method as claimed in claim 1, wherein during regulation, a pollutant limiting value allocated to a respective time or respective vehicle position is taken into consideration.

6. The method as claimed in claim 1, wherein, during regulation, engine characteristic maps stored in the engine control system, which take different variants into account for the operation of the internal combustion engine, are used.

7. The method as claimed in claim 6, wherein during regulation, an interpolation is carried out if no engine characteristic map corresponding to a respective operational state of the internal combustion engine is available.

8. The method according to claim 6, wherein a selection of the different variants is carried out during regulation taking control deviation into consideration without interpolation between the different variants,
   a regulation depending on the control deviation with corresponding interpolation or conversion of a reference variable into an operating-point dependent target value for raw emission of the pollutant in g/(kW·h) is carried out and a regulation is carried out as claimed in a modification depending on the control deviation.

9. The method as claimed in claim 1, wherein a regulation takes place so that a predefined pollutant limiting value of a distance of at least 2 km is adhered to.

* * * * *